United States Patent

[11] 3,575,664

[72] Inventor Gerhard Kamin
Traisa, near Darmstadt, Germany
[21] Appl. No. 824,393
[22] Filed May 9, 1969
[45] Patented Apr. 20, 1971
[73] Assignee Fernseh GmbH
Darmstadt, Germany
[32] Priority May 11, 1968
[33] Germany
[31] P 17 62 267.2

[54] PULSE WIDTH DISCRIMINATION
8 Claims, 2 Drawing Figs.

[52] U.S. Cl. .......... 328/111, 307/234
[51] Int. Cl. .......... H03k 5/20
[50] Field of Search .......... 328/111—113, 58; 307/234, 265

[56] References Cited
UNITED STATES PATENTS
3,036,272 5/1962 Le Vezu .......... 328/112
3,226,570 12/1965 Rosenbaum .......... 307/234X

*Primary Examiner*—Stanley D. Miller, Jr.
*Attorney*—Michael S. Striker

ABSTRACT: The charge on a capacitor is increased linearly with time for the duration of an input pulse. The voltage on the capacitor is applied to a threshold circuit which gives an output signal when the voltage on the capacitor exceeds a predetermined threshold value. The circuit thus furnishes no output signal if the input pulse width is less than a predetermined amount. For wider input pulses the output circuit from the threshold circuit is converted to a pulse. The pulse is then extended for the time period previously cut off by the threshold circuit. The resulting output pulse is thus of the same size as the input pulse when the input pulse width is larger than a predetermined value.

Inventor:
Gerhard Kamin

PULSE WIDTH DISCRIMINATION

BACKGROUND OF THE INVENTION

This invention relates to pulse width discriminators.

In the electronic art, the problem frequently arises of discriminating between pulses of different pulse widths. It may, for example, be required to generate a signal when a pulse exceeds, or is less than, a predetermined width. Pulse width discriminators for generating such signals are well known in the art. However, they generate the signals after the expiration of the pulse, since the information as to the total pulse width is only available, of course, after a pulse has entered. Thus, this type of pulse width discriminator does not furnish any indication of the actual width of a pulse.

For many applications, it is, however, required that the width of a pulse which has passed a pulse width discriminator be known. For example, it is often desirable to furnish an output pulse having the same pulse width as an input pulse, when the width of said input pulse exceeds a predetermined value. To satisfy this type of requirement, the known pulse discriminators must be combined with a storage or a delay device, generally resulting in relatively extensive equipment.

SUMMARY OF THE INVENTION

The purpose of the present invention is therefore to provide a pulse width discriminator which, when input pulses are received whose width exceeds a predetermined pulse width, delivers output pulses whose width corresponds to those of the input pulse.

The pulse discriminator of this invention thus comprises first circuit means operative a predetermined time interval after the start of an input pulse, for furnishing a first pulse having a first pulse width corresponding to the width of an input pulse following said predetermined time interval. Thus, a first pulse is furnished only when the width of the input pulse exceeds a predetermined time interval.

The first pulse, when present, is furnished to second circuit means, which extends the pulse width for a time interval corresponding to said predetermined time interval. The so extended first pulses constitute output pulses. The output pulses are present only for input pulses exceeding a predetermined pulse width. They occur after a predetermined time interval corresponding to said predetermined pulse width, and have a width corresponding to the width of the input pulse.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
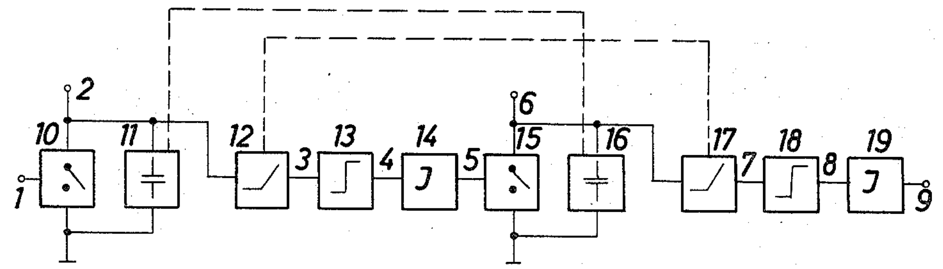
FIG. 1 is a schematic diagram of a pulse width discriminator in accordance with this invention.

A preferred embodiment of the present invention will now be discussed in relation to the drawing.

Figure 2:
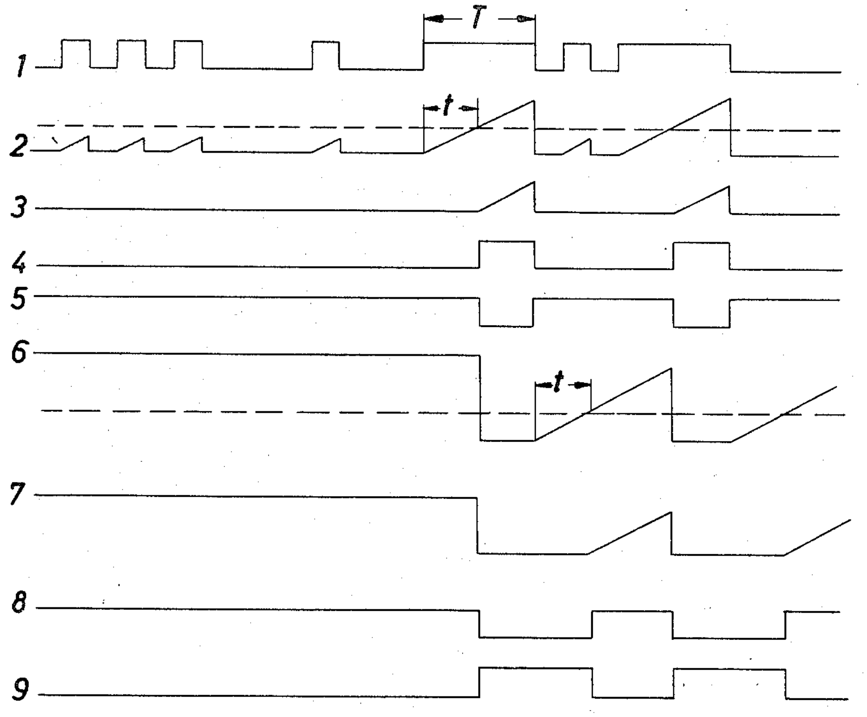
FIG. 2 is a timing diagram showing pulses at corresponding points in the circuit of FIG. 1.

Input pulses furnished to the circuit of FIG. 1 at the point labeled reference numeral 1, are shown in line 1 of FIG. 2. These pulses are used to control electronic switch 10 which is normally closed, but is open, i.e., nonconducting, in the presence of one of these pulses. While switch 10 is open, the capacitor 11 is charged substantially linearly with respect to time from a power source labeled 2 in FIG. 1. This power source is a substantially constant current source. The resulting voltage on the capacitor, namely the voltage at point 11 in FIG. 1 is shown in line 2 in FIG. 2. At the end of each input pulse the capacitor 11 is discharged by the electronic switch 10 and is short-circuited until the arrival of the next input pulse. Obviously, the greater the width of the input pulse, the higher will be the value of the voltage to which the capacitor 11 is charged during the duration of the pulse. The sawtooth voltages shown in line 2 are applied to threshold means, indicated by reference numeral 12 in FIG. 1. This threshold means has a nonlinear characteristic. For input signals which are smaller than a predetermined threshold value, the output voltage is zero. For input voltages exceeding the predetermined threshold value, the first threshold signal, which is the output of the first threshold means, 12, varies substantially linearly with the input to the threshold means.

Thus, it may be seen that input pulses of a pulse width less than a predetermined pulse width will cause no output signal to appear at point 3 of FIG. 1, while input pulses whose pulse width exceeds the predetermined pulse width will cause a sawtooth voltage to appear at point 3 after a predetermined time interval labeled $t$ on line 2 of FIG. 2. The end of the sawtooth voltage will, of course, coincide in time with the end of trailing edge of the input pulse. The first threshold signal, or the sawtooth voltage appearing at point 3 of FIG. 1, is then applied to first pulse shaping means, as for example a Schmitt trigger circuit 13, which converts the sawtooth voltage into a first pulse. These first pulses are then applied to second circuit means which comprise first, an inverter labeled 14 for changing the polarity of the pulse, thus furnishing the negative pulses shown in line 5 of FIG. 2. The inverted first pulses are used to control second switching means labeled 15 in FIG. 1. The second switching means may be constructed similarly to the first switching means, 10. They are connected in parallel to a capacitor 16 which is charged linearly with respect to time from a constant current source when the switching means 15 are open. The switching means 15 are closed (conductive) upon appearance of an inverted first pulse. This causes a discharge of capacitor 16, setting the voltage across the capacitor (06 in FIG. 1) to a reference level, in this case zero. Starting with the trailing edge of the first pulse, switch 15 is opened permitting the charging of capacitor 16 and thus causing a linear increase of voltage across the capacitor. This linearly increasing voltage is referred to as an additional signal. The signal at the output of the capacitor, namely the second signal comprising the reference level signal and the additional signal, is applied to the input of a second threshold means. The second threshold means is similarly constructed to the first threshold means. The second threshold means 17 are set for a threshold level, such that a constant output signal (or no output signal) is furnished until the input signal has reached the threshold level. The threshold level is so adjusted that, at the charging rate of capacitor 16, the voltage on capacitor 16 will change from the reference level to the threshold level during a time interval $t$ equal to the time interval $t$ shown in FIG. 2. The threshold means 17 will thus furnish a second threshold signal which has a constant value from the beginning of the first pulse until the end of a time interval $t$ following the end of the first pulse. Thereafter, the second threshold signal will increase linearly with respect to time until switch 15 is again closed by the subsequent first pulse. The second threshold signal is applied to second pulse shaping means, which may again be a Schmitt trigger circuit. The signal resulting from the Schmitt trigger circuit is shown in line 8 of FIG. 2. It is then applied to an inverter 19 causing the signals shown in line 9 of FIG. 2 to appear at point 9 of FIG. 1. It will be seen that these signals are output pulses which occur at time interval $t$ after the beginning of the corresponding input pulse when said input pulses have a pulse width exceeding the predetermined pulse width $t$. These output pulses will have a pulse width corresponding to the pulse width of the corresponding input pulses. The pulse width of the output pulses may of course be made equal to the pulse width of the corresponding input pulses.

The predetermined pulse width may of course be changed at will by changing the capacitance of capacitors 11 and 16 or varying the threshold values of threshold circuits 12 and 17. If pulses of equal width as the input pulses are desired at the output, it is of course necessary that the charging rate and the threshold value of capacitors 11 and 16 and threshold means 12 and 17 are so adjusted that the time interval labeled *t* in lines 2 and 6 respectively is the same.

Pulse width discriminators according to this invention can be employed with advantage in the analysis of video signals. For example, such pulse width discriminators may be used during the computer evaluation of signals representing images photographed with television cameras, in order to determine dimensions in the horizontal direction suffered of objects being recorded, when these dimensions exceed a predetermined magnitude.

While the invention has been illustrated and described as embodied in particular types of electronic circuits, it is not intended to be limited to the details shown, since various modifications and circuit and structural changes may be made without departing in any way from the spirit of the present invention.

What is claimed as new and desired to be protected by Letters Patent is set forth in the appended claims.

I claim:

1. Pulse width discriminator for processing input pulses, each having a leading edge and a trailing edge, in accordance with the pulse width of said input pulses, comprising, in combination, first circuit means operative a predetermined time interval after the start of an input pulse for furnishing a first pulse having a first pulse width corresponding to the width of said input pulse following said predetermined time interval, whereby a first pulse is furnished only when the width of an input pulse exceeds said predetermined time interval; and second circuit means for extending the width of said First pulse, when present, by a time interval corresponding to said predetermined time interval, said so extended first pulses constituting output pulses, whereby an output pulse of corresponding width is furnished for each input pulse exceeding a predetermined width.

2. A pulse width discriminator as set forth in claim 1, wherein said first circuit means comprise first signal furnishing means responsive to the leading edge of an input signal for furnishing a first signal varying substantially linearly with respect to time during the presence of the corresponding input pulse; first threshold means for furnishing a first threshold signal corresponding to said first signal after said first signal has exceeded a predetermined threshold value; and pulse shaping means for furnishing said first pulses in response to said first threshold signal.

3. A pulse width discriminator as set forth in claim 1, wherein said second circuit means comprise second signal furnishing means for furnishing a second signal comprising a reference level signal in the presence of a first pulse, and an additional signal, starting at said reference level and varying linearly with respect to time upon cessation of said first pulse; second threshold means having a threshold level spaced from said reference level in the direction of variation of said additional signal in accordance with the time rate of variation of said additional signal and said predetermined time interval, said second threshold means thus furnishing a second threshold signal constant from the start of said first pulse until said additional signal exceeds said threshold level; and second pulse-shaping means for shaping the constant portion of said second threshold signal into a substantially rectangular output pulse.

4. A pulse discriminator as set forth in claim 2, wherein said first signal furnishing means comprise a capacitor; a power source for charging said capacitor; and normally closed switching means connected in parallel to said capacitor and adapted to open upon receipt of an input pulse and to stay open for the duration of said input pulse.

5. A pulse width discriminator as set forth in claim 3, wherein said second signal furnishing means comprise a second capacitor; normally open switching means connected in parallel to said second capacitor, and adapted to close in response to said first pulses and remain closed for the duration of each of said first pulses.

6. A pulse width discriminator as set forth in claim 2 wherein said pulse shaping means comprise a Schmitt trigger circuit.

7. A pulse width discriminator as set forth in claim 3, wherein said second pulse shaping means comprise a Schmitt trigger circuit.

8. A pulse width discriminator as set forth in claim 1, wherein said input pulses are derived from video signals by further threshold means.